Jan. 21, 1936.　　　J. A. NIETZEL ET AL　　　2,028,558
DOUBLE LEVER SIDE CUTTING IMPLEMENT
Filed Feb. 26, 1935
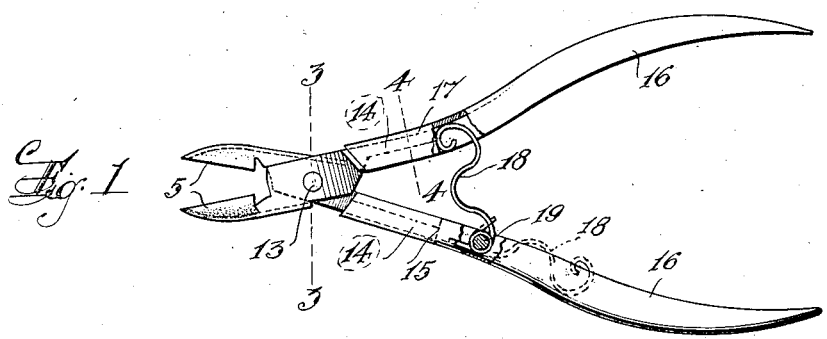
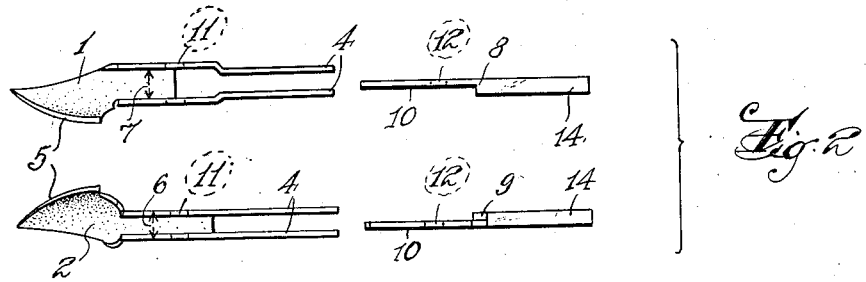
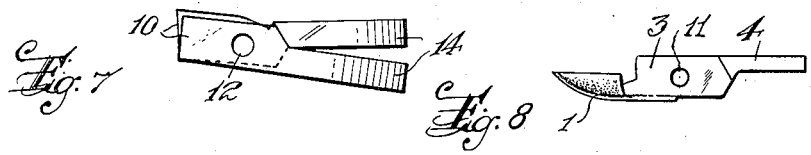
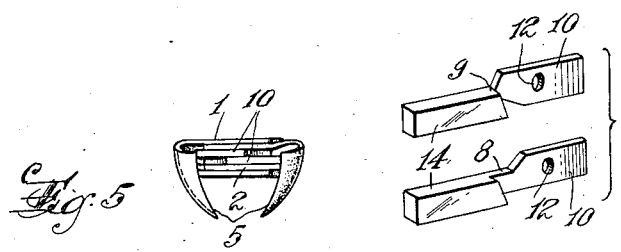
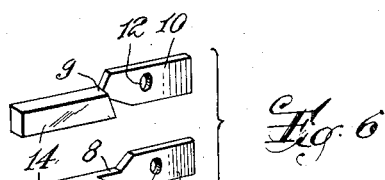
INVENTORS
John A. Nietzel
& Richard Toeplitz
BY
A. D. T. Libby
ATTORNEY Patented Jan. 21, 1936

2,028,558

UNITED STATES PATENT OFFICE 2,028,558

DOUBLE LEVER SIDE CUTTING IMPLEMENT

John A. Nietzel, Elizabeth, and Richard Toeplitz, Irvington, N. J.

Application February 26, 1935, Serial No. 8,250

7 Claims. (Cl. 30—23)

This invention relates to a side cutting implement of the double lever box type and especially to an instrument for cutting cuticle and nails.

As far as we are aware, up to the present time cuticle and nail nippers, and surgical cutting implements have been made from drop forgings requiring several finishing operations such as trimming, milling, drilling, plating and polishing. We have found that the principal weakness of such implements is in the loosening of the fulcrum screw which permits the cutting edges to move out of alignment.

It is the object of our invention to provide a side cutting implement of the double lever box joint type made from suitable sheet metal, thereby reducing greatly the cost of manufacture and at the same time eliminating the weakness referred to, which is inherent in the ordinary type of fulcrum screw joint.

Other and ancillary objects will be clear to one skilled in the art of manufacturing such implements, from a reading of the specification taken in connection with the annexed drawing, wherein:

Figure 1 is a plan view on a somewhat enlarged scale of our improved type of instrument.

Figure 2 is a view on a somewhat enlarged scale of certain parts involved in the construction of the instrument, in disassembled position.

Figure 3 is a section on the line 3—3 of Figure 1.

Figure 4 is a section on the line 4—4 of Figure 1.

Figure 5 is a view looking at the cutting end of the implement with the cutting jaws in separated position.

Figure 6 is a perspective view of two of the reenforcing elements which are shown in Figure 2.

Figure 7 is a view of the same parts of Figure 6, but placed together in assembled position without the pivot pin.

Figure 8 is a side view of one of the cutting members.

In the different views, wherein like numbers refer to corresponding parts, the implement is made up of two cutting members 1 and 2, each having upturned sides 3 which have reduced extensions 4. The ends of the members 1 and 2 opposite the reduced extensions 4 are formed in a curvilinear manner, meeting in a cutting edge 5. The width 6 across the upturned sides of the member 2 is such that the upturned sides of the member 2 will fit snugly within the space 7 between the upturned sides 3 of the member 1.

While it may not be necessary to use reenforcing members in connection with the jaw members 1 and 2, we prefer to use reenforcing members such as are described hereinafter. Positioned within the upturned sides of the member 2, are the ends 10 of the reenforcing members 8 and 9, these ends 10 being flattened and trimmed to the approximate form shown in Figures 2, 6 and 7, so that when they are together as shown in Figure 7, they fill the space between the upturned sides of the member 2, as is clearly shown in Figure 3. The upturned sides of both the members 1 and 2 are provided with a pivot hole 11, and likewise the flattened ends 10 of the members 8 and 9 are provided with pivot holes 12, so that after these parts have been assembled, they are held in operative position by pivot pin 13 which is passed through the holes 11 and 12. The thick or heavy ends 14 of the members 8 and 9 lie respectively between the extensions 4 of the members 1 and 2 and project along with the extensions out to some point indicated by the dotted line 15 of Figure 1.

Lever or handle members 16 are formed so that their inner ends 17 are U-shaped and fit over both the extensions 4 and the ends 14 of the reenforcing members 8 and 9, and are securely fastened thereto as by spot-welding, so that the unitary structure appears about as shown in section in Figure 4.

Preferably, we make the parts 1 and 2, the reenforcing members 8 and 9, and the handles 16 from the same kind of material, whereby the entire implement after being assembled may be hardened and tempered as a whole. To do this, we prefer to make the implement out of .80 carbon steel, although for some purposes the handle and reenforcing members may be of cold rolled steel varying from .20 to .80 carbon, but we prefer not to go below .40. By making the handle of the implement of a higher carbon content, the handle or lever portion will be much stiffer and the implement more satisfactory.

In some cases we prefer to use a spring 18 pivotally mounted at 19 to one of the handle or lever members, with the other end positioned within the channel-shaped end of the other handle or lever adjacent the end of the reenforcing member in said lever. The use of the spring 18 is to hold the cutter or nipper in open position and to open it after pressure is removed from the handle or lever part 16. When a case is used for the instrument, the spring 18 may be turned to the dotted position, so that the implement can be closed and thus occupy a small space.

It will be noted from the section of Figure 3, that the upturned sides 3 of the jaw members 1 and 2 form a box type of joint, wherein a relatively large wearing area is obtained. By the use of this construction, wobble between the jaws is substantially eliminated and the cutting members will come together on the true cutting edge 5.

From what has been said, it will be seen that we have provided a side cutting double lever instrument which is light and cheap to manufacture, yet one which is highly efficient in operation.

What we claim is:

1. An implement of the class described including, a pair of punched and formed members, each having upturned sides with reduced extensions, the width across the said sides of one member being such that said one member will fit snugly within the sides of the other member, the ends of said members opposite to said reduced extensions being formed in a curvilinear manner meeting in a cutting edge, reenforcing members having the corresponding ends thereof formed to snugly fill the space within the inner pair of said upturned sides and also having their opposite ends lying between said reduced extensions, a pivot pin passing through said upturned and overlapping sides and the reenforcing members, and a lever or handle securely fastened to each of said extensions and ends of said reenforcing members which are positioned therebetween.

2. An implement of the class described including, a pair of cutting jaw members of suitable sheet metal and having thin central portions formed with upturned sides in substantially parallel relation, but one adapted to fit within the other in a box-like manner, the corresponding ends of each member being curvilinearly formed and meeting in a cutting edge, while the opposite spaced ends extend a distance beyond said central portions, reenforcing members positioned between each of said spaced ends and having portions extending only within the said box-like formation, a pivot pin going through all the parts of said box-like formation, and a punched and formed lever or handle securely fastened to said opposite ends of each jaw member and its associated reenforcing member.

3. A double lever side cutting implement composed of a pair of punched and formed jaw members having cutting edges and overlapping parts to form a box-like joint, reenforcing members having parts in juxtaposition within the box joint and other portions located between spaced parts of each of said jaw members, a pivot pin going through and completing the box joint, and punched and formed levers securely fastened to the ends of said jaw members and the reenforcing member portions located therebetween and a spring pivotally mounted between said levers for the purpose described.

4. A cutting implement of the class described, composed, except for the pivot pin, of all punched and formed parts, including a pair of jaw members having cutting edges at their free ends and a centrally located box-like joint carrying a pivot pin, reenforcing members having ends located in said box joint and receiving said pivot pin, each jaw member having spaced extensions between which the reenforcing members extend, and levers fastened to said extensions and cooperating reenforcing members.

5. An article of manufacture comprising a cuticle nipper including a pair of relatively short jaw members made from suitable sheet metal, said members having U-shaped central portions formed and inter-fitted with the sides of one U-shaped member enclosed within those of the other member to give a box-like joint of relatively large direct bearing area one on the other, and integral end portions closely adjacent one side of the joint curvilinearly formed into cooperative cutting edges, said members having reduced portions extending only a short distance beyond the box joint opposite to said cutting edges, a pivot pin passing through said box joint and initially separate handles securely fastened to said extending portions.

6. An implement as set forth in claim 5, further characterized in that reenforcing members are carried by each of said jaw members by said pivot, and have their inner ends terminating in said box-like joint and their outer ends anchored to said handles.

7. An article of manufacture of the class described including a pair of short jaw members made from suitable sheet metal, each member having a central portion bent over U-shape, with the arms of the U in parallel relationship to form bearing surfaces of relatively large area, reduced ends extending from said arms of the U for attaching handles thereto, the bottom part and arms of the U, at the end of each of said members opposite from said end extensions, merging into a curvilinear formation having cooperative cutting edges, said arms of the U on one member enclosing and overlapping and closely fitting directly on the arms of the other member, and each having a transverse hole therein for a pivot pin, and handles adapted to be fastened to said end extensions.

JOHN A. NIETZEL.
RICHARD TOEPLITZ.